United States Patent Office 3,133,557
Patented May 19, 1964

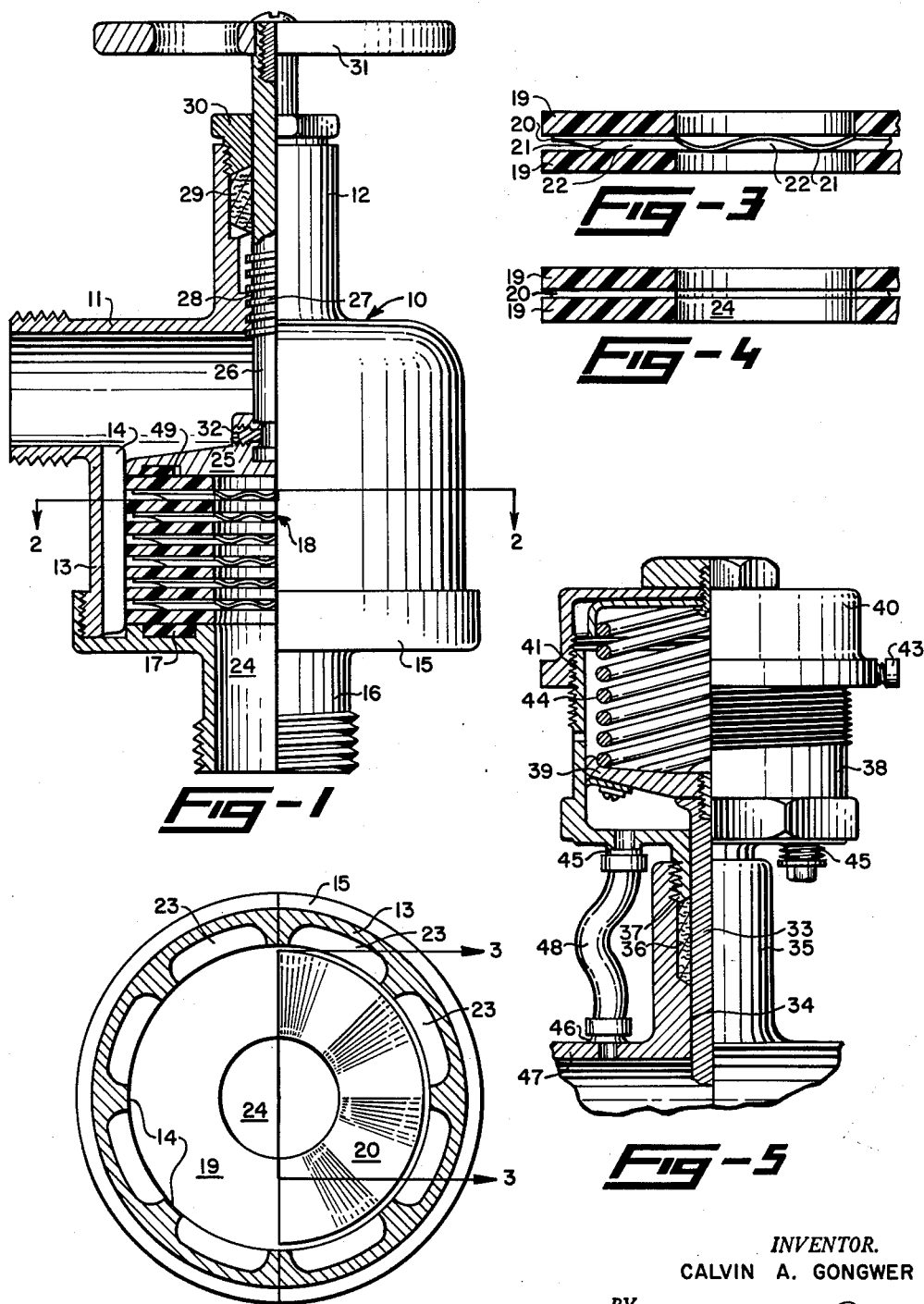

3,133,557
MULTIPLE DISC VALVE
Calvin A. Gongwer, Glendora, Calif., assignor to Aerojet-General Corporation, Azusa, Calif., a corporation of Ohio
Filed Nov. 14, 1960, Ser. No. 68,873
7 Claims. (Cl. 137—512.1)

The present invention relates to valves of the kind used to control the flow of fluid through pipe lines and particularly to such valves used to control the flow of liquid.

A very large number of different forms of such valves are known, many of which while effective for a particular type of use, have various disadvantages making them undesirable for other uses.

In valves used to throttle liquid flow through pipes, dynamic underpressures are created causing cavitation, aeration, and noise. Abrupt changes in the path of flow of the liquid as a valve opens and closes set up frictional losses in the valve and wear on the surfaces. Extreme speed of liquid flow over sharp edges in the valve as may occur in present throttling valves in portions of their opening and closing movement or steady operation in a partially open or throttling condition causes rapid wear, cavitation, and noisy operation.

It is an object of this invention to provide a valve which is free from cavitation, aeration, and noise in operation.

A further object is to provide a valve of simple and sturdy construction which is adapted to be incorporated in various types of installation.

Another object of the invention is to provide a valve subject to a minimum amount of wear of its parts and therefore long lasting in use. Still further objects and features of the invention will hereinafter appear from the following description and accompanying drawings illustrating a preferred embodiment thereof.

In the drawings, FIGURE 1 is a partial cut-away side elevation through a valve constructed according to the present invention.

FIGURE 2 is a section on line 2—2 in FIGURE 1.

FIGURE 3 is a fragmentary detail view in side elevation of one of a plurality of stacked members comprised in the valve, drawn on an enlarged scale and showing the member free of axial pressure.

FIGURE 4 is a view similar to FIGURE 3 but showing the member under maximum axial pressure.

FIGURE 5 is a modification of the control means for the valve adapting it for use as a pressure relief valve, shown partly in cross section and partly in side elevation.

Referring now to FIGURE 1, the numeral 10 indicates a housing with an end provided with a short tubular lateral extension 11 to which a pipe may be secured, and with an axial stub 12 in which operating means may be mounted.

The housing 10 is provided with a cylindrical barrel 13 with spaced ribs 14 projecting inwardly from its inner surface. The open end of barrel 13 is closed by a cap 15 having a central tubular extension 16 to which a second pipe may be connected. An annular washer 17 is positioned between the end cap 15 and end of barrel 13 to provide a fluid tight joint. A stack of a plurality of annular resilient members is indicated at 18, these members being stacked upon each other in the barrel 13. Each member 18, FIGURE 3, comprises a thick flat annular washer 19 of rigid material, such as "Teflon," the washers fitting freely within the rib 14, and a corrugated washer 20 of spring material of somewhat less diameter than washers 19, the corrugations extending radially across the washers.

The corrugation 21 of the washers 20 and the flat washers 19 lying opposite them, provide radial passages 22 communicating in the absence of axial pressure sufficient to flatten out washers 20 against washers 19. The spaces 23 between the stack of members 18 and the wall of the casing and the space 24 are formed by the central openings of the annular washers 19 and 20, said tubular extension 16 being aligned with space 24.

The end of space 24 opposite extension 16 is closed by a head 25 in the form of a disc in which a washer 49 of rubber or the like is inset to engage against a top washer 19 of the stack. Pressure may be applied to head 25 by any suitable means from a degree sufficient only to seal the top of the stack without decreasing the cross section of passages 22, to an amount sufficient to flatten out the resilient washers 20 and cut off communication between spaces 23 and 24, as shown in FIGURE 4.

The means for applying axial pressure shown in FIGURE 1 comprises a stem 26 secured at its inner end to pressure head 25 and advanced or retracted axially by the engagement of a threaded portion 27 of the stem with a threaded portion 28 of an axial bore in stub 12. The open end of the axial bore in stub 12 is sealed fluid tight by packing 29 and gland nut 30 in the usual manner. The operating hand wheel 31 is mounted on the squared end of stem 26 and retained thereon by any suitable means. In order to adapt the valve for use in lines leading fluid to either space 23 or 24, stem 26 is shown as retained in a socket in pressure head 25 by a set screw 32 having a cylindrical end engaging in a peripheral slot in the end of stem 26, thus enabling the stem to positively open the valve. In the embodiment of the invention shown in FIGURE 5, which acts as a pressure relief valve, the operating stem 33 is not threaded and projects through a smooth bore 34 in stub 35, the upper end of which is sealed by packing 36 and packing gland nut 37 which may be formed integral with a cylindrical housing 38.

A spring supporting seat 39 is secured to the upper end of stem 33 and is a sliding fit in housing 38. The open end of housing 38 is closed by a cap 40 having an interior threaded portion 41 engaging with a threaded portion 41 of the exterior of the housing 38. The rim of the cap 40 is thickened, a retaining threaded stud 43 may be mounted in a hole drilled in the thickened rim to retain the cap 40 in adjusted position on housing 38.

A coil spring 44 is mounted under compression between the spring seat 39 and cap 40.

Nipples 45 are provided on the bottom of housing 38 and a nipple 46 is mounted on the wall of the conduit 47 leading fluid under pressure to the valve. A short length of pressure hose 48, after packing 36 has been compressed, is connected between nipples 45 and 46 so that the pressure fluid will enter housing 38 under spring seat 39 and exerts pressure against spring 44.

The spring 44 is compressed to a value sufficient to hold the valve closed unless the pressure in conduit 47 and under spring seat 39 is sufficient to raise stem 33 against the effort of the spring and cause the valve to open and the pressure fluid to flow to a by-pass or exhaust until the pressure falls sufficiently to enable spring 44 to again close the valve. It is to be understood that the arrangement of the valve elements other than the spring loaded control stem may be the same as that described with respect to the embodiment shown in FIGURE 1.

It will be noted that if the valve of the invention is to be used only to control fluid entering through tubular stub 16, stem 26 need not be connected to pressure head 25 since the pressure of the fluid will be exerted against the pressure head and will hold the valve open to the extent permitted by the setting of stem 26.

In order to enable the valve to be used to control fluid entering the housing in either direction, that is through either 11 or 16, the stem 26 must be positively connected, as shown in FIGURE 1, to the pressure head.

In FIGURE 5, it is assumed that pressure fluid enters the housing through a conduit above the top of the stack of flow controlling elements, the valve being generally similar to that shown in FIGURE 1 and acting as an automatic pressure release valve. However, if the pressure fluid enters the interior of the stack, it would act against the spring 44 and no communication of the pressure to the spring housing to act to raise stem 33 would be required.

Valve cavitation is avoided by the present invention as the valve is throttled since the valve passages are of a capillary nature and the pressure energy is absorbed therein. By the resistance of the small passages, dynamic underpressures are avoided and hence cavitation and noise is eliminated.

A modified construction of the valve described may include a stack of resilient annular corrugated elements, alternate ones of which are provided with corrugations of a different radius so that the annular elements are spaced from one another when the stack is free from axial pressure, or alternatively the corrugations in alternate annular elements could be slanted between the outer and inner edges along lines running in different directions in the alternate elements. The described embodiment is preferred, however, because of simplicity in assembly and elimination of wear on the resilient annular members.

Preferred embodiments of the invention have been specifically described and shown by way of illustration but not as limitative of the invention since modifications therein may be made by those skilled in the art in the arrangements of the parts of the valve and in the manner of its utilization without departing from the scope of the invention as defined by the appended claims.

What is claimed is:

1. A valve adapted to be connected in a fluid flow line comprising; a housing, a stack of annular fluid flow control elements arranged in said housing, means effective to space said stack from the interior surface of said housing, resilient elements arranged in said stack, said resilient elements having corrugations extending across the annular elements to space them from adjacent elements and provide passages for the flow of fluid from outside the stack into the interior thereof when the stack is free from axial pressure, means to vary the spacing between the annular elements to vary the passages therebetween from fully open to fully closed, conduit means in flow communication with the space between said stack and the wall of the housing and conduit means in flow communication with the space within said stack, and means preventing fluid flow through said housing to the space within said stack.

2. A valve comprising; a housing adapted to be connected in fluid lines, annular fluid flow controlling means arranged in said housing with the outer periphery thereof spaced from the wall of the housing, said means having resilient elements arranged between rigid elements, the contacting surfaces of certain of said resilient elements being corrugated to provide at times passages for the flow of fluid beteen the spaces at the inner and outer peripheries of said elements, means to vary the height of the passages between said rigid and resilient elements, conduit means in flow communication with the space between the wall of the housing and the outer periphery of said annular flow controlling means and conduit means in flow communication with the space formed by the inner openings of said annular elements, and means preventing fluid flow through said housing to the space formed by the inner openings.

3. A valve comprising; a circular housing having spaced inwardly projecting ribs, annular fluid flow controlling means having resilient elements interposed between rigid elements and arranged in a stack spaced from the inner surface of said housing by said ribs, the contacting surfaces of certain of said resilient elements being corrugated to provide at times passages for the flow of fluid through the spaces between the stack of elements and the housing and the space within said stack of annular elements, means to apply axial pressure to said stack of annular elements to vary the passage space between the resilient and rigid elements, conduit means in flow communication with the space between the wall of the housing and said stack of elements and conduit means in flow communication with the space formed by the inner openings of said annular elements, and sealing means preventing fluid flow through said housing to the space formed by the inner openings of said annular elements.

4. A valve as set forth in claim 3 and in which said means to apply axial pressure to the stack of annular elements comprise; a pressure head bearing against an end of said stack, a threaded stem engaged in a threaded bore in the housing and extending outwardly therefrom, the inner end of said stem engaging against said pressure head, means to effect rotation of said stem to exert pressure on said pressure head to move said annular fluid controlling means toward closed position and at other times to relieve the pressure on said pressure head to enable the fluid controlling means to move toward open position.

5. A valve as set forth in claim 4 and in which said stem is connected to said pressure head by means comprising; a socket provided in said pressure head, the inner end of said stem being received in said socket, a peripheral groove in the portion of the stem received in said socket, and a member engaging both with said head and in said peripheral groove to effect positive movement of the pressure head to relieve pressure on the annular fluid controlling elements when the stem is moved in an outward direction.

6. A valve comprising; a circular housing having spaced inwardly projecting ribs, inlet conduit means formed on said housing, annular fluid flow controlling means having resilient elements interposed between rigid elements and arranged in a stack spaced from the inner surface of said housing by said ribs, the contacting surfaces of certain of said resilient elements being corrugated to provide at times passages for the flow of fluid through the spaces between the stack of elements and the housing and the space within said stack of annular elements, means to apply axial pressure to said stack of annular elements to vary the passage space between said resilient and rigid elements, said inlet conduit means in flow communication with the space within the stack of annular fluid control elements, and an outlet conduit in flow communication with the space between the exterior of the stack and the interior of the housing, and sealing means preventing fluid flow through said housing to the space within the stack.

7. A valve comprising a circular housing having spaced inwardly projecting ribs, an inlet conduit formed on said housing, annular fluid flow controlling means having resilient elements interposed between rigid elements and arranged in a stack spaced from the inner surface of said housing by said ribs, the contacting surfaces of certain of said resilient elements being corrugated to provide at times passages for the flow of fluid through the spaces between the stack of elements and the housing and the space within said stack of annular elements, a pressure head abutting against the end of said stack opposite to said inlet conduit, a stem engaging with said pressure head and extending axially outward of said housing, fluid sealing means between the housing and said stem, adjustable resilient means mounted on said housing and bearing against said stem to move the pressure head in a direction tending to close said annular elements on one another, said inlet conduit being in flow communication with the space within said stack of annular elements, an outlet conduit in flow communication with the spaces between the stack of annular elements and the housing, and fluid flow to the spaces between said stack of annular elements and said housing from the space within said stack of annular elements being prevented except when the pressure of fluid effectively acting against the biasing action of said adjustable resilient means is sufficient to cause the pressure head to be moved in a direction opposed to the biasing action of said adjustable resilient means for forming passages between adjacent annular elements of said stack of annular elements.

References Cited in the file of this patent

UNITED STATES PATENTS

| | | |
|---|---|---|
| 1,572,591 | Cannon | Feb. 9, 1926 |
| 2,530,090 | Smith | Nov. 14, 1950 |
| 2,821,999 | Cahen | Feb. 4, 1958 |